United States Patent
Guo et al.

(10) Patent No.: US 11,134,229 B2
(45) Date of Patent: Sep. 28, 2021

(54) MODEL TRAINING METHOD, CHROMATIC ABERRATION CORRECTION METHOD, APPARATUS, MEDIUM AND ELECTRONIC DEVICE

(71) Applicants: Beijing BOE Display Technology Co., Ltd., Beijing (CN); BOE TECHNOLOGY GROUP CO., LTD., Beijing (CN)

(72) Inventors: Yue Guo, Beijing (CN); Lei Liu, Beijing (CN); Yanjun Sun, Beijing (CN); Qian Zhang, Beijing (CN); Juan Wang, Beijing (CN)

(73) Assignees: Beijing BOE Display Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 123 days.

(21) Appl. No.: 16/556,373

(22) Filed: Aug. 30, 2019

(65) Prior Publication Data
US 2020/0288092 A1 Sep. 10, 2020

(30) Foreign Application Priority Data
Mar. 7, 2019 (CN) .......................... 201910171735.3

(51) Int. Cl.
*H04N 9/04* (2006.01)
*G06T 7/90* (2017.01)

(52) U.S. Cl.
CPC .......... *H04N 9/04517* (2018.08); *G06T 7/90* (2017.01); *G06T 2207/10024* (2013.01); *G06T 2207/20081* (2013.01)

(58) Field of Classification Search
CPC .... H04N 9/04517; H04N 1/6033; G06T 7/90; G06T 2207/20081; G06T 2207/10024
See application file for complete search history.

(56) References Cited

U.S. PATENT DOCUMENTS

| | | | |
|---|---|---|---|
| 9,349,162 B1 | 5/2016 | Chen et al. | |
| 2002/0180996 A1* | 12/2002 | Allen | G03G 15/01 358/1.9 |

(Continued)

FOREIGN PATENT DOCUMENTS

| | | |
|---|---|---|
| CN | 103905803 A | 7/2014 |
| CN | 106651785 A | 5/2017 |

(Continued)

OTHER PUBLICATIONS

1st Office Action dated Jul. 17, 2020 for Chinese Patent Application No. 201910171735.3.

(Continued)

*Primary Examiner* — Kenny A Cese
(74) *Attorney, Agent, or Firm* — Thomas | Horstemeyer, LLP

(57) ABSTRACT

A model training method includes: constructing a mapping model between original color information values and standard color information values of images with a coefficient matrix; establishing an objective function of the mapping model based on a regular term of a variable exponent; determining original color information values and standard color information values of a plurality of sample images; and calculating the objective function from the original color information values and the standard color information values of the plurality of sample images to determine the coefficient matrix.

18 Claims, 6 Drawing Sheets

(56) References Cited

U.S. PATENT DOCUMENTS

2015/0348245 A1* 12/2015 Horiuchi .................. H04N 9/67
  382/167
2017/0337708 A1* 11/2017 Bordes .................... G06T 5/007

FOREIGN PATENT DOCUMENTS

| CN | 108712639 A | 10/2018 |
| CN | 109274948 A | 1/2019 |

OTHER PUBLICATIONS

Gao, Kun, et al. "Variable exponent regularization approach for blur kernel estimation of remote sensing image blind restoration." IEEE Access 6 (2018): 4352-4374.

* cited by examiner

MODEL TRAINING METHOD, CHROMATIC ABERRATION CORRECTION METHOD, APPARATUS, MEDIUM AND ELECTRONIC DEVICE

CROSS-REFERENCE TO RELATED APPLICATIONS

The present application claims priority to Chinese Patent Application No. 201910171735.3 and filed Mar. 7, 2019, the entire contents of which are incorporated herein by reference.

TECHNICAL FIELD

The present disclosure relates to the field of image processing technology, and in particularly, to a model training method, a chromatic aberration correction method, a model training apparatus, a chromatic aberration correction apparatus, a storage medium and an electronic device.

BACKGROUND

As one of the most intuitive and basic features in image information, color information plays an important role in human cognition and discrimination of objects. The color information of an object is usually determined by a relative spectral power distribution of a light source, a reflectivity of the object, and visual characteristics of a viewer to colors. However, spectral tristimulus values of an imaging system sensor to the three primary colors of red, green, and blue are different from spectral tristimulus values determined by a standard human chroma observer, resulting in a difference in color between the acquired color image and the color image observed by the human eyes. In addition, when the color image acquired by the imaging system is displayed on a display device, the color image of the display may further cause chromatic aberration due to gamma correction deviation or the like.

Therefore, in an image processing process, it is necessary to perform chromatic aberration correction on the image. However, the chromatic aberration correction effect of the color image is affected by many factors, and there is no good chromatic aberration correction scheme in the related art, which causes the color of the imaged object to deviate from the true color of the object.

It should be noted that the information disclosed in the Background section above is only for enhancement of understanding of the background of the present disclosure, and thus may include information that does not constitute prior art known to those of ordinary skill in the art.

SUMMARY

An object of the present disclosure is to provide a model training method, a chromatic aberration correction method, a model training apparatus, a chromatic aberration correction apparatus, a storage medium, and an electronic device.

According to one aspect of the present disclosure, there is provided a model training method, including: constructing a mapping model between original color information values and standard color information values of images with a coefficient matrix; establishing an objective function of the mapping model based on a regular term of a variable exponent; determining original color information values and standard color information values of a plurality of sample images; and calculating the objective function from the original color information values and the standard color information values of the plurality of sample images to determine the coefficient matrix.

In an exemplary embodiment of the present disclosure, determining original color information values and standard color information values of a plurality of sample images includes: acquiring images of standard color cards taken by an imaging device as sample images: and determining original color information values and standard color information values of the plurality of sample images.

In an exemplary embodiment of the present disclosure, determining standard color information values of the plurality of sample images includes: measuring tristimulus values of the sample images under a predetermined geometric condition by a spectrometer; and determining the tristimulus values measured by the spectrometer as the standard color information values of the sample images.

In an exemplary embodiment of the present disclosure, determining standard color information values of the plurality of sample images includes: taking standard three-channel pixel values of the standard color cards corresponding to the sample images as the standard color information values of the sample images.

In an exemplary embodiment of the present disclosure, determining the original color information values of the plurality of sample images includes: determining three-channel pixel values of the sample images; and determining the original color information values of the sample images based on the three-channel pixel values of the sample images.

In an exemplary embodiment of the present disclosure, establishing an objective function of the mapping model based on a regular term of a variable exponent includes: determining the variable exponent of the regular term based on an ideal value of the coefficient matrix; and establishing the objective function of the mapping model based on the regular term.

In an exemplary embodiment of the present disclosure, calculating the objective function from the original color information values and the standard color information values of the plurality of sample images to determine the coefficient matrix includes: determining an expression of a coefficient matrix based on the objective function; performing iteration on the expression of the coefficient matrix with the original color information values and standard color information values of the plurality of sample images until the coefficient matrix converges.

In an exemplary embodiment of the present disclosure, the model training method further includes: respectively determining values of two objective functions corresponding to two consecutive iterative processes; and when the values of the two objective functions satisfy a preset comparison requirement, determining that the coefficient matrix converges.

According to one aspect of the present disclosure, there is provided a chromatic aberration correction method, including: acquiring an original color information value of a target image; determining a trained mapping model, wherein the mapping model is configured to determine a mapping relationship between an original color information value and a standard color information value; determining a standard color information value of the target image corresponding to the original color information value of the target image through the trained mapping model; and replacing the original color information value of the target image with the standard color information value of the target image to correct chromatic aberration of the target image.

In an exemplary embodiment of the present disclosure, the chromatic aberration correction method further includes: training the mapping model by the model training method according to any one of the above exemplary embodiment to obtain the trained mapping model.

In an exemplary embodiment of the present disclosure, replacing the original color information value of the target image with the standard color information value of the target image to correct chromatic aberration of the target image includes: when the standard color information of the target image is expressed in a form of a tristimulus value, converting the tristimulus value into a three-channel pixel value; and replacing the original color information value of the target image with the standard color information value of the target image expressed in the form of the three-channel pixel value.

According to one aspect of the present disclosure, there is provided a model training apparatus, including: a model constructing module, an objective function establishing module, a sample determining module and a model training module.

Specifically, the model constructing module is configured to construct a mapping model between original color information values and standard color information values of images with a coefficient matrix; the objective function establishing module is configured to establish an objective function of the mapping model based on a regular term of a variable exponent; the sample determining module is configured to determine original color information values and standard color information values of a plurality of sample images; and the model training module is configured to calculate the objective function from the original color information values and the standard color information values of the plurality of sample images to determine the coefficient matrix.

In an exemplary embodiment of the present disclosure, the sample determining module is configured to perform: acquiring images of standard color cards taken by an imaging device as sample images; and determining original color information values and standard color information values of the plurality of sample images.

In an exemplary embodiment of the present disclosure, the sample determining module includes a first standard value determining unit.

Specifically, the first standard value determining unit is configured to measure tristimulus values of the sample images under a predetermined geometric condition by a spectrometer: and determine the tristimulus values measured by the spectrometer as the standard color information values of the sample images.

In an exemplary embodiment of the present disclosure, the sample determining module includes a second standard value determining unit.

Specifically, the second standard value determining unit is configured to take standard three-channel pixel values of the standard color cards corresponding to the sample images as the standard color information values of the sample images.

In an exemplary embodiment of the present disclosure, the sample determining module includes an original value determining unit.

Specifically, the original value determining unit is configured to determine three-channel pixel values of the sample images; and determine the original color information values of the sample images based on the three-channel pixel values of the sample images.

In an exemplary embodiment of the present disclosure, the objective function establishing module is configured to perform: determining the variable exponent of the regular term based on an ideal value of the coefficient matrix; and establishing the objective function of the mapping model based on the regular term.

In an exemplary embodiment of the present disclosure, the model training module is configured to perform: determining an expression of a coefficient matrix based on the objective function: and performing iteration on the expression of the coefficient matrix with the original color information values and standard color information values of the plurality of sample images until the coefficient matrix converges.

In an exemplary embodiment of the present disclosure, the model training module is configured to perform: respectively determining values of two objective functions corresponding to two consecutive iterative processes; and when the values of the two objective functions satisfy a preset comparison requirement, determining that the coefficient matrix converges.

According to one aspect of the present disclosure, there is provided a chromatic aberration correction apparatus, including: an original value acquiring module, a model determining module, a standard value determining module, and a chromatic aberration correcting module.

Specifically, the original value acquiring module is configured to acquire an original color information value of a target image. The model determining module is configured to determine a trained mapping model, wherein the mapping model is configured to determine a mapping relationship between an original color information value and a standard color information value; the standard value determining module is configured to determine a standard color information value of the target image corresponding to the original color information value of the target image through the trained mapping model; the chromatic aberration correcting module is configured to replace the original color information value of the target image with the standard color information value of the target image to correct the chromatic aberration of the target image.

In an exemplary embodiment of the present disclosure, the chromatic aberration correction apparatus includes any one of the above described model training apparatuses.

In an exemplary embodiment of the present disclosure, the chromatic aberration correcting module is configured to perform: converting the tristimulus value into a three-channel pixel value when the standard color information of the target image is expressed in a form of a tristimulus value; and replacing the original color information value of the target image with the standard color information value of the target image expressed in the form of the three-channel pixel value.

According to one aspect of the present disclosure, there is provided a storage medium having stored thereon a computer program, wherein the computer program is executed by a processor to implement the model training method according to any one of the above exemplary embodiments or the chromatic aberration correction method according to any one of the above exemplary embodiments.

According to one aspect of the present disclosure, there is provided an electronic device, including: a processor; a memory for storing executable instructions of the processor; wherein the processor is configured to perform the model training method according to any one of the above exemplary embodiments or the chromatic aberration correction method according to any one of the above exemplary embodiments by executing the executable instructions.

It should be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. It is apparent that the drawings in the following description are only some of the embodiments of the present disclosure, and other drawings may be obtained from those skilled in the art without paying creative efforts. In the drawing.

DETAILED DESCRIPTION

Figure 1:
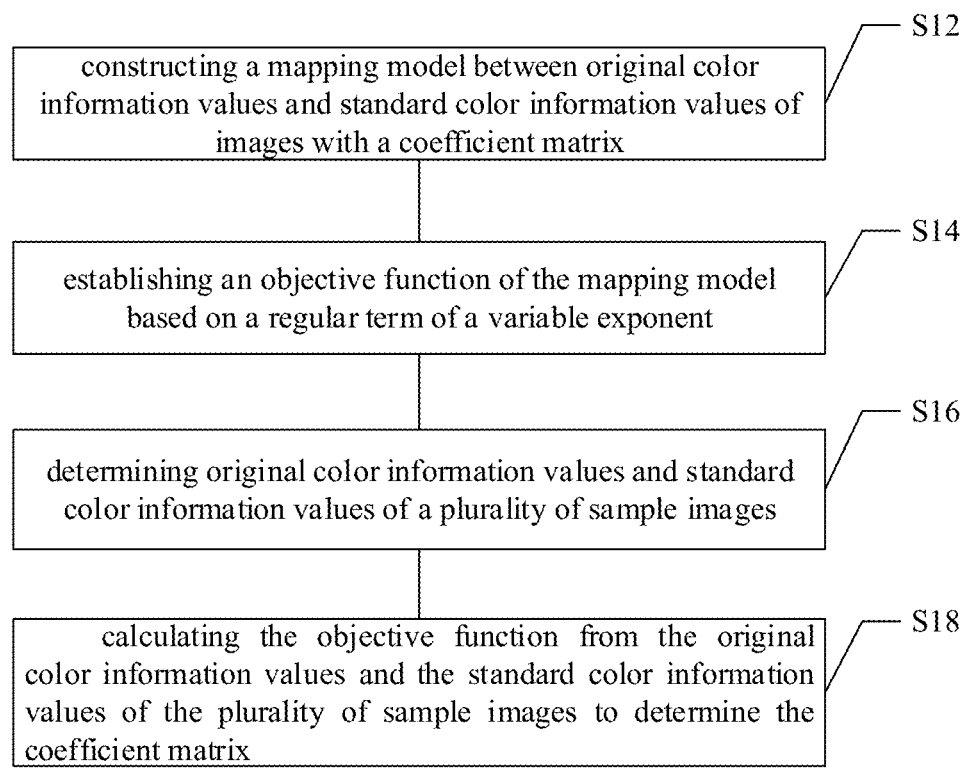
FIG. 1 schematically shows a flowchart of a model training method according to an exemplary embodiment of the present disclosure.

Example embodiments will now be described more fully with reference to the accompanying drawings. However, the example embodiments can be embodied in a variety of forms and should not be construed as being limited to the examples set forth herein. Rather, these embodiments are provided to make the present disclosure more thorough and complete, and to fully convey the concept of the exemplary embodiments to those skilled in the art. The described features, structures, or characteristics can be combined in any suitable manner in one or more embodiments. In the following description, numerous specific details are set forth to enable complete understanding of the embodiments of the present disclosure. However, one skilled in the art will appreciate that one or more of the specific details can be omitted or other methods, components, devices, steps, etc. can be employed. In other instances, various aspects of the present disclosure are not provided to avid obscuring the details of the present disclosure.

In addition, the drawings are merely schematic representations of the present disclosure and are not necessarily drawn to scale. The same reference numerals in the drawings denote the same or similar parts, and the repeated description thereof will be omitted, Some of the block diagrams shown in the figures are functional entities and do not necessarily have to correspond to physically or logically separate entities. These functional entities can be implemented in software, or implemented in one or more hardware modules or integrated circuits, or implemented in different networks and/or processor devices and/or microcontroller devices.

The flowcharts shown in the figures are merely illustrative and do not necessarily include all of the steps. For example, some steps can be decomposed, and some steps can be combined or partially merged, so the actual execution order can vary depending on the actual situation.

The model training method and/or the chromatic aberration correction method of the exemplary embodiment of the present disclosure can be implemented by a server. That is, the server can perform various steps of the following model training method and/or chromatic aberration correction method. In this case, the apparatus and the modules corresponding to the model training method and/or the chromatic aberration correction method can be configured to be provided in the server. In addition, the process of model training can be implemented on one server, and the process of chromatic aberration correction can be implemented on another server. That is, model training and model application (chromatic aberration correction) can be distributed in two separate servers. However, it is easily understood that the model training and the model application can be implemented based on the same server, which is not particularly limited in the present exemplary embodiment.

In addition, it should be understood that a terminal device (e.g., a mobile phone, a tablet, etc.) can also implement various steps of the following methods, and corresponding devices and modules can be configured in the terminal device. In this case, for example, a terminal can be used to perform chromatic aberration correction on the image captured in real time.

FIG. 1 schematically shows a flow chart of a model training method of an exemplary embodiment of the present disclosure. Referring to FIG. 1, the model training method can include the following steps.

In the step of S12, a mapping model between original color information values and standard color information values of images is constructed with a coefficient matrix.

In an exemplary embodiment of the present disclosure, an original color information value of an image can be a color information value of the image read by a computer system. That is, the original color information value can be a color information value acquired by an imaging device in a non-special manner. A special manner herein can include a manner for acquiring image information under a predetermined geometric condition. For example, the predetermined geometric condition for acquiring image information can include: acquiring image information at standard reflection measurement geometry condition 45°×:0° recommended by CIE 15:2004 in a RAW format by the imaging device.

A standard color information value of an image can be a color information value that can be measured in a special manner to characterize the true color of the captured object. In addition, if the captured object is a standard color card, the color information value corresponding to the standard color card is the standard color information value described in the present disclosure.

It is easy to understand that there is a correspondence between the original color information value and the standard color information value, and the present disclosure can construct a mapping model to represent the relationship between the two. Specifically, a coefficient matrix can be used to construct a mapping model between the original color information value and the standard color information value of the image, and the mapping model can be expressed as Equation 1:

$$PM=D \quad \text{(Equation 1)}$$

Where, P denotes the original color information value, D denotes the standard color information value, and M denotes the coefficient matrix.

In the step of S14, an objective function of the mapping model is established based on a regular term of a variable exponent.

In an exemplary embodiment of the present disclosure, an objective function with a regular term can be established, which can also be referred to as a cost function. Specifically, the regular term is a regular term of a variable exponent $L\rho$ ($1<\rho<2$), and the objective function can be determined through Equation 2:

$$E(M) = \min \tfrac{1}{2} \|PM-D\|_2^2 + \lambda \|M\|_\rho^\rho \quad \text{(Equation 2)}$$

Where $\lambda$ is the weight of the regular term, which can be determined through trial and error, and the value range can be between 0 and 1.

For the specific value of $\rho$ in Equation 2, it can be determined through Equation 3:

$$\rho(W_j) = 1 + \cfrac{1}{1 + \cfrac{k}{W_j^2}} \quad \text{(Equation 3)}$$

Where $W_j$ is the ideal value of the coefficient matrix to be solved; k is a constant and can usually be taken as 1. As can be seen from the above equation, $\rho$ can be flexibly adjusted in the range of (1, 2) according to $W_j$ and $\rho>1$. In addition, $\lambda$ and k can be adjusted according to the actual data set. The disclosure does not specifically limit the specific values of the two parameters.

In the step of S16, original color information values and standard color information values of a plurality of sample images are determined.

In an exemplary embodiment of the present disclosure, the server can acquire images of standard color cards taken by an imaging device as the sample images.

Figure 2:
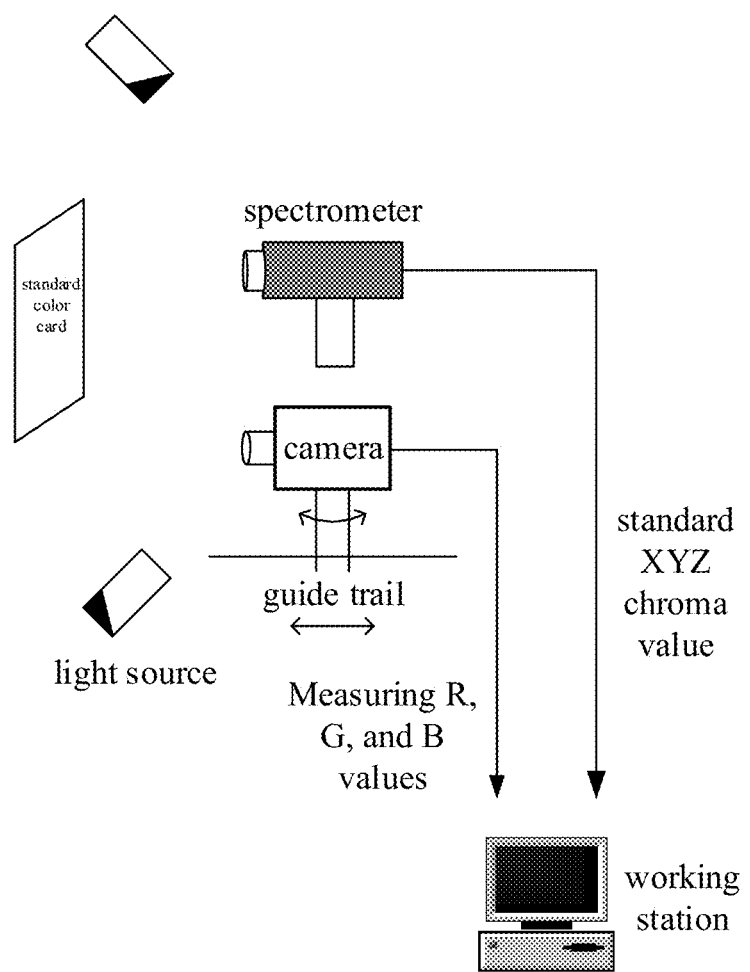
FIG. 2 schematically illustrates a system architecture diagram of acquiring a sample image according to an exemplary embodiment of the present disclosure.

Specifically, the color correction experiment can be designed according to the ISO17321-1 standard to determine the sample image. As shown in the architecture of FIG. 2, a standard color card is used as a target, and the standard color card can contain rich color block information. The standard color card used in the present disclosure can include, but is not limited to, an X-Rite Color Checker Digital SG 140 color card (X-Rite Digital SG 140 color professional color card), Gretgmacbeth ColorChecker 24 color card (American Macbeth 24 color card) and the like. An image is taken by an imaging device in the RAW format under a standard reflection measurement geometry condition of 45°×:0° recommended by CIE 15:2004, to obtain a color image as a sample image in which light is irradiated in 45° direction and received in the 0° direction.

After determining a plurality of sample images, for determining standard color information values for the plurality of sample images, according to some embodiments of the present disclosure, first, tristimulus values of the sample images can be measured by a spectrometer under the predetermined geometric condition described above. Specifically, the X, Y. and Z chromaticity values of each color block in the standard color card can be measured by a spectrometer under the geometric condition of 45°×:0°, where X can represent the stimulus value of the red primary color, and Y can represent the stimulus value of the green primary color. Z can represent the stimulus value of the blue primary color. That is, the X, Y. and Z chromaticity values can be used to characterize the tristimulus values.

Next the server can obtain the X, Y, and Z chromaticity values and determine the standard color information value of the sample image from the X, Y, and Z chromaticity values. Specifically, the server can perform brightness normalization on the X, Y, and Z chrominance values. For example, the Y value of the standard white color block can be normalized to 100, thereby determining the normalization coefficient. Then, the X, Y, and Z chromaticity values are adjusted with the normalization coefficient, and the adjusted X, Y. and Z chromaticity values are determined as standard color information value.

According to further embodiments of the present disclosure, the standard three-channel pixel value of the standard color card corresponding to the sample image can also be directly used as the standard color information value of the sample image. The standard three-channel pixel value of the standard color card can be the R, G, and B values in the sRGB (standard Red Green Blue) mode in the specification standard color card.

For determining the original color information values of the plurality of sample images, three-channel pixel values of the sample images can be determined, and the original color information values of the sample images are determined based on the three-channel pixel values of the sample images. For example, first, the acquired images in the RAW format can be converted into gray-readable TIFF images with CameraRaw software. Next, the center of each color block can be determined by Matlab programming, and 5×5 area at the center of each image can be read in batches. An average value of the grayscales of the 5×5 area at the center of each batch is calculated, and the average value of the grayscales can be used as the original color information value.

Further, corresponding to the step of S12, the original color information value P can be expressed as a combination of R, G, and B values. Specifically, the original color information value P can be expressed as the following form of $P_1$, $P_2$ and $P_3$:

$$P_1 = (R, G, B)$$

$$P_2 = (R^2, G^2, B^2, RG, RB, GB, P_1)$$

$$P_3 = (R, G, B, \sqrt{RG}, \sqrt{RB}, \sqrt{GB}, \sqrt[3]{RBG})$$

However, those skilled in the art, in conjunction with the concepts of the embodiments of the present disclosure, can determine that the original color information value can also be expressed in other forms, which are all within the scope of the present disclosure.

In addition, the samples used in the model training of the present disclosure can also be determined by downloading through a network or purchasing from a professional company, and so on, which is not specifically limited in the exemplary embodiment.

In the step of S18, the objective function is calculated from the original color information values and the standard color information values of the plurality of sample images to determine the coefficient matrix.

First, an expression of the coefficient matrix can be determined based on the objective function. Specifically, the objective function represented by the above equation 2 can be derived, and the derivative is zero to determine the coefficient matrix M as expressed by Equation 4:

$$M=(P^TP+\lambda\text{Diag})^{-1}P^TD \quad \text{(Equation 4)}$$

Where Diag can be expressed as Equation 5:

$$\text{Diag} = \begin{Bmatrix} \rho(W_j)|M_1|^{\rho(W_j)-2} \\ \rho(W_j)|M_2|^{\rho(W_j)-2} \\ \ldots \\ \rho(W_j)|M_j|^{\rho(W_j)-2} \end{Bmatrix} \quad \text{(Equation 5)}$$

Next, the expression of the coefficient matrix can be iteratively processed using the original color information values and the standard color information values of the plurality of sample images until the coefficient matrix converges.

Specifically, the above iterative process can be implemented by a Gauss-Seidel iterative method. First, an initial value $M^Q$ can be previously assigned to the ideal value W of the coefficient matrix, and the initial value $M^Q$ can be assigned by the user. Next, in the iterative process, the coefficient matrix is continuously updated by the result of the previous step. For example, at the i-th time of iteration, using Equation 4, $M^i$ can be calculated based on $M^{i-1}$ and $\rho^{i-1}$ of the previous step, where i is a positive integer greater than one.

In the iterative process, values of two objective functions corresponding to two successive iteration processes are respectively determined. If the values of the two objective functions satisfy the preset comparison requirement, the coefficient matrix is determined as being converged.

Specifically, when the values of the two objective functions are characterized as $E^i$ and $E^{i-1}$, the preset comparison requirement can be $E^i$ being greater than $E^{i-1}$. However, the preset comparison requirement can also be $|E^i-E^{i-1}|^2$ $\delta$, where $\delta$ is greater than 0 and infinitely close to zero.

It is easy to understand that in the exemplary embodiment of the present disclosure, if the values of the two objective functions do not satisfy the preset comparison requirement, $\rho$ can be updated through Equation 3 to continue the iteration.

The coefficient matrix is determined using a Gauss-Seidel iteration method in step S18. However, the present disclosure can also determine the coefficient matrix in other manners, for example, a Jacobi iterative method or the like, which is not particularly limited in the exemplary embodiment.

According to the model training method of the exemplary embodiment of the present disclosure, on the one hand, by using the regular term of the variable exponent, and combining the advantages of Ridge regression and Lasso regression, a smooth convergence result can be obtained to make the model have a higher accuracy and stability, while taking into account scarcity to simplify the model; on the other hand, the mapping model of the present disclosure can be applied to different data sets such as Gaussian distribution, Laplacian distribution, etc., and has good compatibility.

Further, chromatic aberration correction method is also provided in an exemplary embodiment of the present disclosure.

Figure 3:
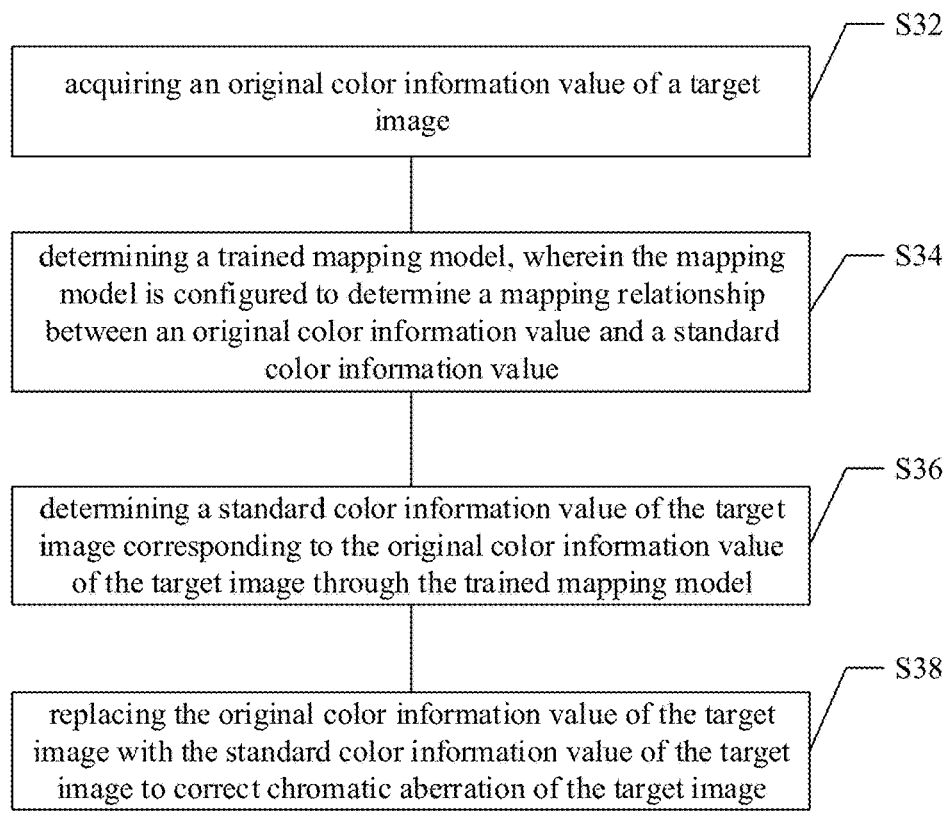
FIG. 3 schematically illustrates a flowchart of a chromatic aberration correction method according to an exemplary embodiment of the present disclosure.

FIG. 3 schematically shows a flowchart of a chromatic aberration correction method of an exemplary embodiment of the present disclosure. Referring to FIG. 3, the chromatic aberration correction method can include the following steps.

In the step of S32, an original color information value of a target image is acquired.

In an exemplary embodiment of the present disclosure, a color image can be acquired as a target image by an imaging device. The present disclosure does not specifically limit the type of the target image. Next, the computer system can directly read the original color information value of the target image.

In the step of S34, a trained mapping model is determined, wherein the mapping model is configured to determine a mapping relationship between an original color information value and a standard color information value.

In an exemplary embodiment of the present disclosure, the mapping model determined in the step of S34 can be the mapping model mentioned in steps of S12 to S18 of the above-described model training method.

In the step of S36, a standard color information value of the target image corresponding to the original color information value of the target image is determined through the trained mapping model.

Taking the original color information value of the target image determined in step S32 as P, using the above equation 1 in which the coefficient matrix M has been determined, the corresponding standard color information value can be determined.

In the step of S38, the original color information value of the target image is replaced with the standard color information value of the target image to correct the chromatic aberration of the target image.

According to some embodiments of the present disclosure, first, if the standard color information of the target image is expressed in the form of a tristimulus value, the tristimulus value can be converted into a three-channel pixel value. Specifically, the conversion can be performed through Equation 6:

$$\begin{bmatrix} R \\ G \\ B \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix} \quad \text{(Equation 6)}$$

Next, the original color information value expressed in the form of a three-channel pixel value can be used instead of the original information value of the target image.

In the chromatic aberration correction method according to an exemplary embodiment of the present disclosure, on the one hand, it can solve the problem that the model is limited by the training data set in some technologies, resulting in poor performance and instability; on the other hand, the chromatic aberration correction can have improved accuracy, and have practicality and adaptability.

It should be noted that although the various steps of the method of the present disclosure are described in a particular order in the drawings, this does not require or imply that the steps must be performed in that particular order, or that all the steps shown must be performed to achieve the desired result. Additionally or alternatively, certain steps can be omitted, multiple steps can be combined into one step, and/or one step can be decomposed into multiple steps and the like.

Further, a model training apparatus is also provided in an exemplary embodiment of the present disclosure.

Figure 4:
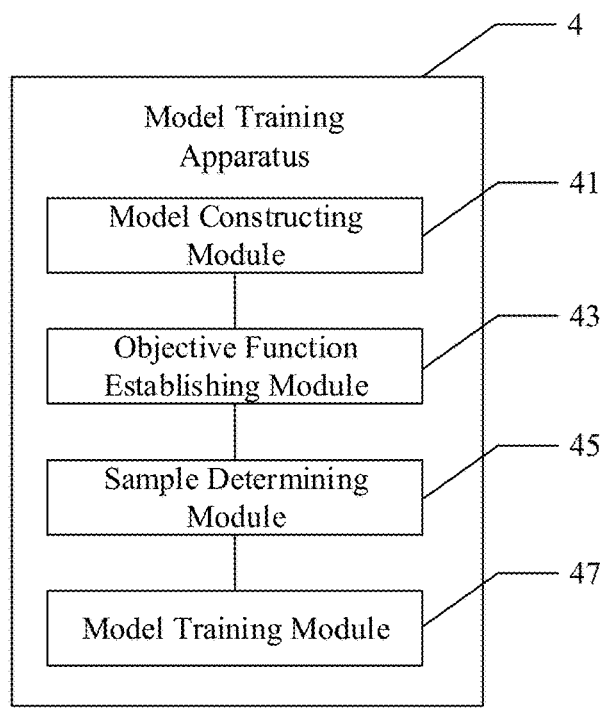
FIG. 4 schematically illustrates a block diagram of a model training apparatus according to an exemplary embodiment of the present disclosure.

FIG. 4 schematically shows a block diagram of a model training apparatus of an exemplary embodiment of the present disclosure. Referring to FIG. 4, the model training apparatus 4 according to an exemplary embodiment of the present disclosure can include a model constructing module 41, an objective function establishing module 43, a sample determining module 45, and a model training module 47.

Specifically, the model constructing module 41 can be configured to construct a mapping model between original color information values and standard color information values of images with a coefficient matrix. The objective function establishing module 43 can be configured to establish an objective function of the mapping model based on a regular term of a variable exponent. The sample determining module 45 can be configured to determine original color information values and standard color information values of a plurality of sample images. The model training module 47 can be configured to calculate the objective function from the original color information values and the standard color information values of the plurality of sample images to determine the coefficient matrix.

According to the model training apparatus according to the disclosed exemplary embodiment, on the one hand, by using the regular term of the variable exponent, a smooth convergence result can be obtained to make the model have a higher accuracy and stability, while taking into account sparsity to simplify the model; on the other hand, the mapping model of the present disclosure can be applied to different data sets such as Gaussian distribution, Laplacian distribution, etc., and has good compatibility.

According to an exemplary embodiment of the present disclosure, the sample determining module 45 can be configured to perform: acquiring images of standard color cards taken by an imaging device as sample images; and determining original color information values and standard color information values of the plurality of sample images.

Figure 5:
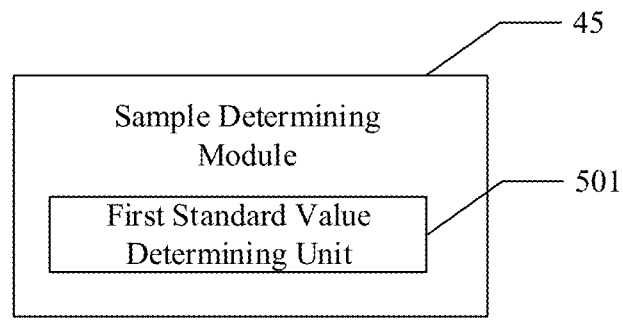
FIG. 5 schematically illustrates a block diagram of a sample determining module according to an exemplary embodiment of the present disclosure.

According to an exemplary embodiment of the present disclosure, referring to FIG. 5, the sample determining module 45 can include a first standard value determining unit 501.

Specifically, the first standard value determining unit 501 can be configured to measure tristimulus values of the sample images under a predetermined geometric condition by a spectrometer; and determine the tristimulus values measured by the spectrometer as the standard color information values of the sample images.

Figure 6:
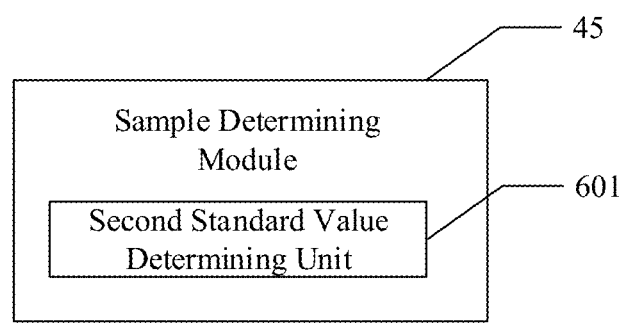
FIG. 6 schematically illustrates a block diagram of a sample determining module according to another exemplary embodiment of the present disclosure.

According to an exemplary embodiment of the present disclosure, referring to FIG. 6, the sample determining module 45 can include a second standard value determining unit 601.

Specifically, the second standard value determining unit 601 can be configured to take standard three-channel pixel values of the standard color cards corresponding to the sample images as the standard color information values of the sample images.

Figure 7:
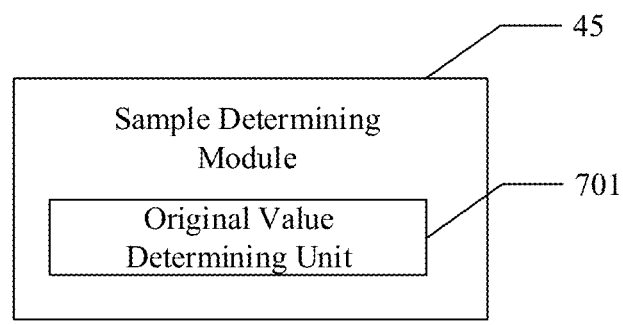
FIG. 7 schematically illustrates a block diagram of a sample determining module according to yet another exemplary embodiment of the present disclosure.

According to an exemplary embodiment of the present disclosure, referring to FIG. 7, the sample determining module 45 can include an original value determining unit 701.

Specifically, the original value determining unit 701 can be configured to determine three-channel pixel values of the sample images; and determine the original color information values of the sample images based on the three-channel pixel values of the sample images.

According to an exemplary embodiment of the present disclosure, the objective function establishing module 43 can be configured to perform: determining the variable exponent of the regular term based on an ideal value of the coefficient matrix: and establishing the objective function of the mapping model based on the regular term.

According to an exemplary embodiment of the present disclosure, the model training module 47 can be configured to perform: determining an expression of a coefficient matrix based on the objective function; and performing iteration on the expression of the coefficient matrix with the original color information values and standard color information values of the plurality of sample images until the coefficient matrix converges.

According to an exemplary embodiment of the present disclosure, the model training module 47 can be configured to perform: respectively determining values of two objective functions corresponding to two consecutive iterative processes; and when the values of the two objective functions satisfy a preset comparison requirement, determining that the coefficient matrix converges.

Further, a chromatic aberration correction apparatus is further provided in an exemplary embodiment of the present disclosure.

Figure 8:
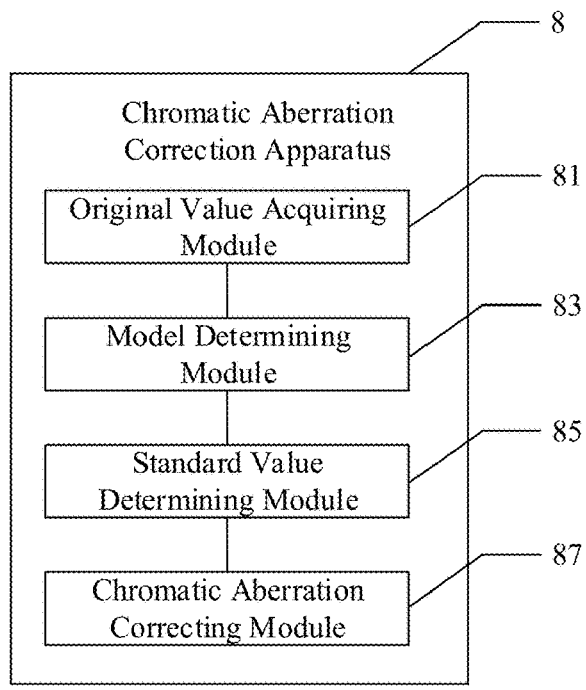
FIG. 8 schematically illustrates a block diagram of a chromatic aberration correction apparatus according to an exemplary embodiment of the present disclosure.

FIG. 8 schematically shows a block diagram of a chromatic aberration correction apparatus of an exemplary embodiment of the present disclosure. Referring to FIG. 8, the chromatic aberration correction apparatus 8 according to an exemplary embodiment of the present disclosure can include an original value acquiring module 81, a model determining module 83, a standard value determining module 85, and a chromatic aberration correcting module 87.

Specifically, the original value acquiring module 81 can be configured to acquire an original color information value of a target image. The model determining module 83 can be configured to determine a trained mapping model, wherein the mapping model is configured to determine a mapping relationship between an original color information value and a standard color information value. The standard value determining module 85 can be configured to determine a standard color information value of the target image corresponding to the original color information value of the target image through the trained mapping model. The chromatic aberration correcting module 87 can be configured to replace the original color information value of the target image with the standard color information value of the target image to correct the chromatic aberration of the target image.

In the chromatic aberration correction apparatus according to an exemplary embodiment of the present disclosure, on one hand, it can solve the problem that the model is limited by the training data set in some technologies, resulting in poor performance and instability; on the other hand, the chromatic aberration correction can have improved accuracy, and have practicality and adaptability.

Figure 9:
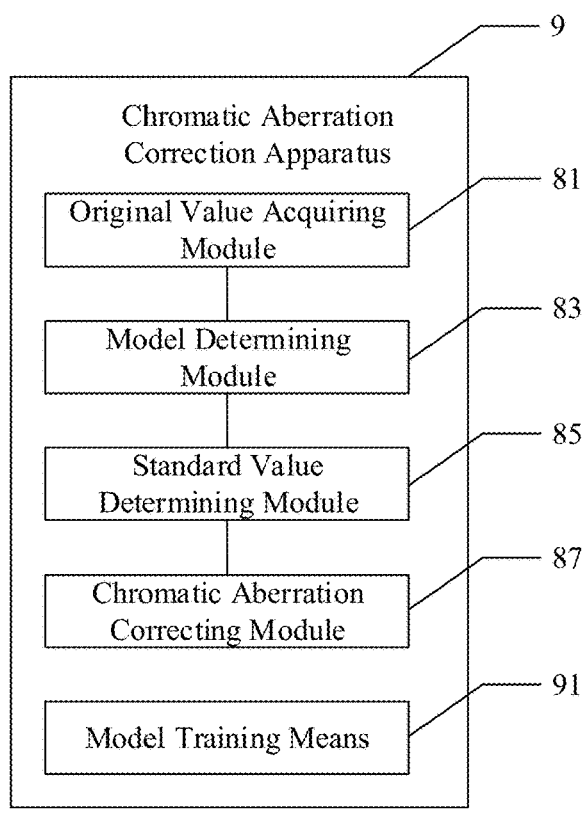
FIG. 9 schematically illustrates a block diagram of a chromatic aberration correction apparatus according to another exemplary embodiment of the present disclosure.

According to an exemplary embodiment of the present disclosure, referring to FIG. 9, the chromatic aberration correction apparatus 9 can also include a model training means 91 in addition to the original value acquiring module 81, the model determining module 83, the standard value determining module 85, and the chromatic aberration correcting module 87, compared with the chromatic aberration correction apparatus 8.

Specifically, the model training apparatus 9 can be identical to the model training apparatus 4 described above.

According to an exemplary embodiment of the present disclosure, the chromatic aberration correcting module 87 can be configured to perform: converting the tristimulus value into a three-channel pixel value when the standard color information of the target image is expressed in a form of a tristimulus value; and replacing the original color information value of the target image with the standard color information value of the target image expressed in the form of the three-channel pixel value.

The function modules of the apparatus which is configured to run program to perform analysis and provided by the embodiment of the present disclosure are the same as those of the above-described method embodiment of the present disclosure, details of which will not be repeated herein.

In an exemplary embodiment of the present disclosure, there is also provided a computer readable storage medium having stored thereon a program product capable of implementing the above method of the present specification. In some possible implementations, aspects of the present disclosure can also be embodied in the form of a program product including program codes. When the program product is running on a terminal device, the program codes cause the terminal device to perform the steps according to the exemplary embodiments of the present disclosure described in the above "Exemplary Methods" section of the specification.

Figure 10:
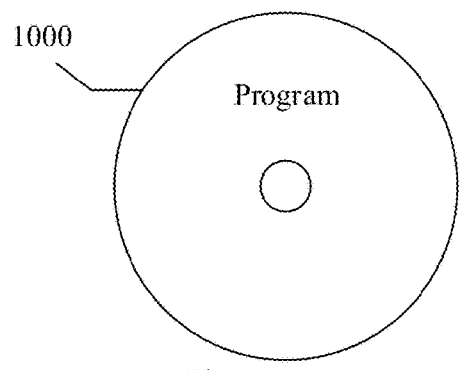
FIG. 10 schematically illustrates a schematic diagram of a storage medium according to an exemplary embodiment of the present disclosure.

Referring to FIG. 10, a program product 1000 for implementing the above method according to the exemplary embodiments is illustrated, which can be implemented in a portable compact disk read only memory (CD-ROM) and includes program codes, and can be executed on a terminal device, such as a personal computer. However, the program product of the present disclosure is not limited thereto, and in the present document the readable storage medium can be any tangible medium containing or storing a program that can be used by or in connection with an instruction execution system, apparatus or device.

The program product can be any combination of one or more readable media. The readable medium can be a readable signal medium or a readable storage medium. The readable storage medium can be, for example, but not limited to, an electronic, magnetic, optical, electromagnetic, infrared, or semiconductor system, apparatus, or device, or any combination of the above, More specific examples (non-exhaustive lists) of a readable storage medium include: electrical connections with one or more wires, a portable disk, a hard disk, a random access memory (RAM), a read only memory (ROM), an erasable Programmable read only memory (EPROM or flash memory), an optical disk, a portable compact disk read only memory (CD-ROM), an optical storage device, a magnetic storage device, or any suitable combination of the foregoing.

The computer readable signal medium can include a data signal that is propagated in the baseband or as part of a carrier wave carrying readable program codes. Such propagated data signals can take a variety of forms including, but not limited to, electromagnetic signals, optical signals, or any suitable combination of the foregoing. The readable signal medium can also be any readable medium other than a readable storage medium that can transmit, propagate, or transport a program for use by or in connection with an instruction execution system, apparatus, or device.

Program codes embodied on a readable medium can be transmitted using any suitable medium, including but not limited to wireless, wireline, optical cable, RF, etc., or any suitable combination of the foregoing.

Program codes for performing the operations of the present disclosure can be written in any combination of one or more programming languages, including an object oriented programming language such as Java. C++, etc., including conventional procedural programming language—such as the "C" language or a similar programming language. The program codes can execute entirely on the user computing device, partially on the user device, as a stand-alone software package, partially on the remote computing device and partially on the user computing device, or entirely on the remote computing device or server. In the case of a remote computing device, the remote computing device can be connected to the user computing device via any kind of network, including a local area network (LAN) or wide area network (WAN), or can be connected to an external computing device (e.g., connected via the Internet through an Internet service provider).

In an exemplary embodiment of the present disclosure, an electronic device capable of implementing the above method is also provided.

Those skilled in the art will appreciate that various aspects of the present disclosure can be implemented as a system, a method, or a program product. Therefore, various aspects of the present disclosure can be embodied in the form of a complete hardware implementation, a complete software implementation (including firmware, microcode, etc.), or a combination of hardware and software, which can be collectively referred to herein as "circuit", "module" or "system".

Figure 11:
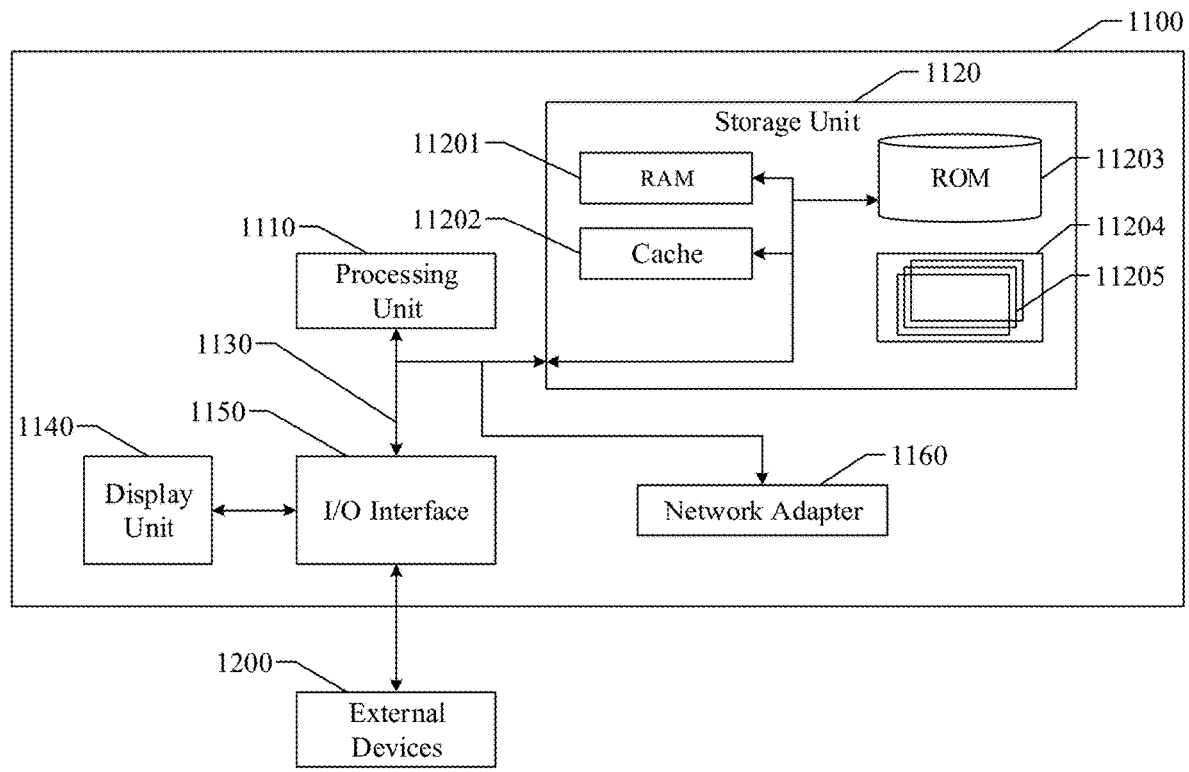
FIG. 11 schematically illustrates a block diagram of an electronic device according to an exemplary embodiment of the present disclosure.

An electronic device 1100 according to this embodiment of the present disclosure will now be described with reference to FIG. 11. The electronic device 1100 shown in FIG. 11 is merely an example and should not impose any limitation on the function and scope of application of the embodiments of the present disclosure.

As shown in FIG. 1, the electronic device 1100 is embodied in the form of a general purpose computing device. The components of the electronic device 1100 can include, but are not limited to, the at least one processing unit 1110, the at least one storage unit 1120, a bus 1130 that connecting different system components (including the storage unit 1120 and the processing unit 1110), and a display unit 1140.

Wherein the storage unit stores program codes, which can be executed by the processing unit 1110, such that the processing unit 1110 performs steps of various exemplary embodiments according to the present disclosure described in the "Exemplary Method" section of the present specification. For example, the processing unit 1110 can perform the model training method described in steps S12 to S18 as shown in FIG. 1 or the chromatic aberration correction method described in steps S32 to S38 as shown in FIG. 3.

The storage unit 1120 can include a readable medium in the form of a volatile storage unit, such as a random access storage unit (RAM) 11201 and/or a cache storage unit 11202, and can further include a read only storage unit (ROM) 11203.

The storage unit 1120 can also include a program/utility 11204 having a set (at least one) of program modules 11205, such program modules 11205 including but not limited to: an operating system, one or more applications, other program modules, and program data. Implementations of the network environment can be included in each or combination of these examples.

The bus 1130 can be one or more of a number of types of bus structures, including a memory unit bus or a memory unit controller, a peripheral bus, a graphics acceleration port, a processing unit, or a local area bus using any of a variety of bus structures.

The electronic device 1100 can also be in communication with one or more external devices 1200 (e.g., a keyboard, a pointing device, a Bluetooth device, etc.), and can also be in communication with one or more devices that enable a user to interact with the electronic device 1100, and/or any device (e.g., router, modem, etc.) that enables the electronic device 1100 to communicate with one or more other computing devices. This communication can take place via an input/output (I/O) interface 1150. Also, the electronic device 1100 can communicate with one or more networks (e.g., a local area network (LAN), a wide area network (WAN), and/or a public network, such as the Internet) through a network adapter 1160. As shown, the network adapter 1160 communicates with other modules of electronic device 1100 via the bus 1130. It should be understood that although not shown in the figures, other hardware and/or software modules can be utilized in conjunction with electronic device 1100, including but not limited to: microcode, device drivers, redundant processing units, external disk drive arrays, RAID systems, tape drives and data backup storage systems, etc.

Through the description of the above embodiments, those skilled in the art will readily understand that the exemplary embodiments described herein can be implemented by software or by software in combination with necessary hardware. Therefore, the technical solutions according to the embodiments of the present disclosure can be embodied in the form of a software product, which can be stored in a non-volatile storage medium (which can be a CD-ROM, a USB flash drive, a mobile hard disk, etc.) or on a network. A number of instructions are included to cause a computing device (which can be a personal computer, a server, a terminal device, or a network device, etc.) to perform the methods according to the embodiments of the present disclosure.

Further, the above-described drawings are merely illustrative of the processes included in the methods according to the exemplary embodiments of the present disclosure, and are not intended to be limiting. It is easy to understand that the processing shown in the above figures does not indicate or limit the chronological order of these processes. In addition, it is also easy to understand that these processes can be performed synchronously or asynchronously, for example, in a plurality of modules.

It should be noted that although several modules or units of equipment for action execution are mentioned in the detailed description above, such division is not mandatory. Indeed, according to embodiments of the present disclosure, the features and functions of two or more modules or units described above can be embodied in one module or unit. Conversely, the features and functions of one of the modules or units described above can be further divided into multiple modules or units.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A model training method, comprising:
constructing a mapping model between original color information values and standard color information values of images with a coefficient matrix;
establishing an objective function of the mapping model based on a regular term of a variable exponent by:
determining the variable exponent of the regular term based on an ideal value of the coefficient matrix; and
establishing the objective function of the mapping model based on the regular term;
determining original color information values and standard color information values of a plurality of sample images; and
calculating the objective function from the original color information values and the standard color information values of the plurality of sample images to determine the coefficient matrix by:
determining an expression of the coefficient matrix based on the objective function; and
performing iteration on the expression of the coefficient matrix with the original color information values and standard color information values of the plurality of sample images until the coefficient matrix converges;
respectively determining values of two objective functions corresponding to two consecutive iterative processes; and
when the values of the two objective functions satisfy a preset comparison requirement, determining that the coefficient matrix converges.

2. The model training method according to claim 1, wherein determining original color information values and standard color information values of a plurality of sample images comprises:
acquiring images of standard color cards taken by an imaging device as sample images; and
determining original color information values and standard color information values of the plurality of sample images.

3. The model training method according to claim 2, wherein determining standard color information values of the plurality of sample images comprises:
measuring tristimulus values of the sample images under a predetermined geometric condition by a spectrometer; and
determining the tristimulus values measured by the spectrometer as the standard color information values of the sample images.

4. The model training method according to claim 2, wherein determining standard color information values of the plurality of sample images comprises:
taking standard three-channel pixel values of the standard color cards corresponding to the sample images as the standard color information values of the sample images.

5. The model training method according to claim 2, wherein determining the original color information values of the plurality of sample images comprises:
determining three-channel pixel values of the sample images; and determining the original color information values of the sample images based on the three-channel pixel values of the sample images.

6. A chromatic aberration correction method, comprising:
acquiring an original color information value of a target image;
determining a trained mapping model, wherein the mapping model is obtained using the model training method according to claim 1 and is configured to determine a mapping relationship between an original color information value and a standard color information value;
determining a standard color information value of the target image corresponding to the original color information value of the target image through the trained mapping model; and
replacing the original color information value of the target image with the standard color information value of the target image to correct chromatic aberration of the target image.

7. The chromatic aberration correction method according to claim 6, wherein determining original color information values and standard color information values of a plurality of sample images comprises:
acquiring images of standard color cards taken by an imaging device as sample images; and
determining original color information values and standard color information values of the plurality of sample images.

8. The chromatic aberration correction method according to claim 7, wherein determining standard color information values of the plurality of sample images comprises:
measuring tristimulus values of the sample images under a predetermined geometric condition by a spectrometer; and
determining the tristimulus values measured by the spectrometer as the standard color information values of the sample images.

9. The chromatic aberration correction method according to claim 7, wherein determining standard color information values of the plurality of sample images comprises: taking standard three-channel pixel values of the standard color cards corresponding to the sample images as the standard color information values of the sample images.

10. The chromatic aberration correction method according to claim 6, wherein replacing the original color information value of the target image with the standard color information value of the target image to correct chromatic aberration of the target image comprises:
when the standard color information of the target image is expressed in a form of a tristimulus value, converting the tristimulus value into a three-channel pixel value; and
replacing the original color information value of the target image with the standard color information value of the target image expressed in the form of the three-channel pixel value.

11. A model training apparatus for performing the model training method according to claim 1, comprising:
a model constructing module configured to construct the mapping model between original color information values and standard color information values of images with the coefficient matrix;
an objective function establishing module configured to establish the objective function of the mapping model based on the regular term of the variable exponent;

a sample determining module configured to determine the original color information values and the standard color information values of the plurality of sample images; and
a model training module configured to calculate the objective function from the original color information values and the standard color information values of the plurality of sample images to determine the coefficient matrix.

12. A chromatic aberration correction apparatus, comprising:
an original value acquiring module configured to acquire an original color information value of a target image;
a model determining module configured to determine a trained mapping model, wherein the mapping model is obtained using the model training method according to claim 1 and is configured to determine a mapping relationship between an original color information value and a standard color information value;
a standard value determining module configured to determine a standard color information value of the target image corresponding to the original color information value of the target image through the trained mapping model; and
a chromatic aberration correcting module configured to replace the original color information value of the target image with the standard color information value of the target image to correct the chromatic aberration of the target image.

13. A storage medium having stored thereon a computer program, wherein the computer program is executed by a processor to implement the model training method according to claim 1.

14. A storage medium having stored thereon a computer program, wherein the computer program is executed by a processor to implement the chromatic aberration correction method according to claim 6.

15. An electronic device, comprising:
a processor;
a memory for storing executable instructions of the processor;
wherein the processor is configured to perform the model training method according to claim 1 by executing the executable instructions.

16. An electronic device, comprising:
a processor;
a memory for storing executable instructions of the processor;
wherein the processor is configured to perform the chromatic aberration correction method according to claim 6 by executing the executable instructions.

17. A system, comprising:
at least one computing device comprising at least one hardware processor;
program instructions stored in memory and executable by the at least one hardware processor that, when executed, direct the at least one computing device to:
construct a mapping model between original color information values and standard color information values of images with a coefficient matrix;
establish an objective function of the mapping model based on a regular term of a variable exponent by:
determining the variable exponent of the regular term based on an ideal value of the coefficient matrix; and
establishing the objective function of the mapping model based on the regular term;

determine original color information values and standard color information values of a plurality of sample images; and calculate the objective function from the original color information values and the standard color information values of the plurality of sample images to determine the coefficient matrix by:

determining an expression of the coefficient matrix based on the objective function; and performing iteration on the expression of the coefficient matrix with the original color information values and standard color information values of the plurality of sample images until the coefficient matrix converges;

respectively determine values of two objective functions corresponding to two consecutive iterative processes; and when the values of the two objective functions satisfy a preset comparison requirement, determine that the coefficient matrix converges.

18. A non-transitory computer-readable storage medium embodying program instructions executable by at least one hardware processor that, when executed, direct the at least one hardware processor to:

construct a mapping model between original color information values and standard color information values of images with a coefficient matrix;

establish an objective function of the mapping model based on a regular term of a variable exponent by:

determining the variable exponent of the regular term based on an ideal value of the coefficient matrix; and establishing the objective function of the mapping model based on the regular term;

determine original color information values and standard color information values of a plurality of sample images; and calculate the objective function from the original color information values and the standard color information values of the plurality of sample images to determine the coefficient matrix by:

determining an expression of the coefficient matrix based on the objective function; and performing iteration on the expression of the coefficient matrix with the original color information values and standard color information values of the plurality of sample images until the coefficient matrix converges;

respectively determine values of two objective functions corresponding to two consecutive iterative processes; and when the values of the two objective functions satisfy a preset comparison requirement, determine that the coefficient matrix converges.

\* \* \* \* \*